Figure 1:
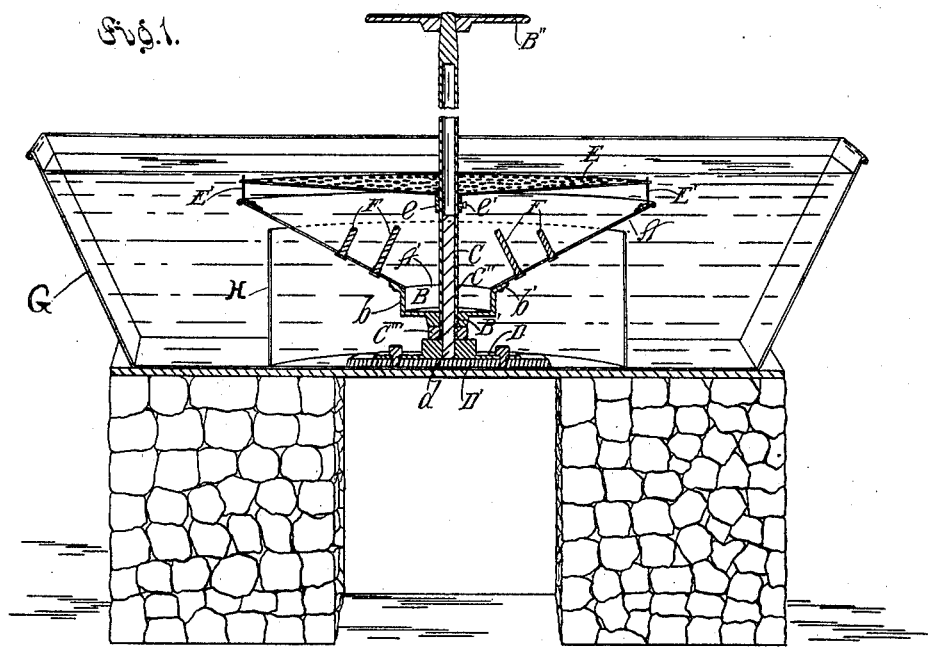

No. 672,413. Patented Apr. 16, 1901.
T. J. BURKE.
GOLD SAVING APPLIANCE.
(Application filed Feb. 2, 1898. Renewed Mar. 22, 1901.)

(No Model.) 2 Sheets—Sheet 1.

Witnesses
Perry Kingman
E. A. Waterman

Inventor
Thomas J. Burke
by Townsend Bros.
his attys.

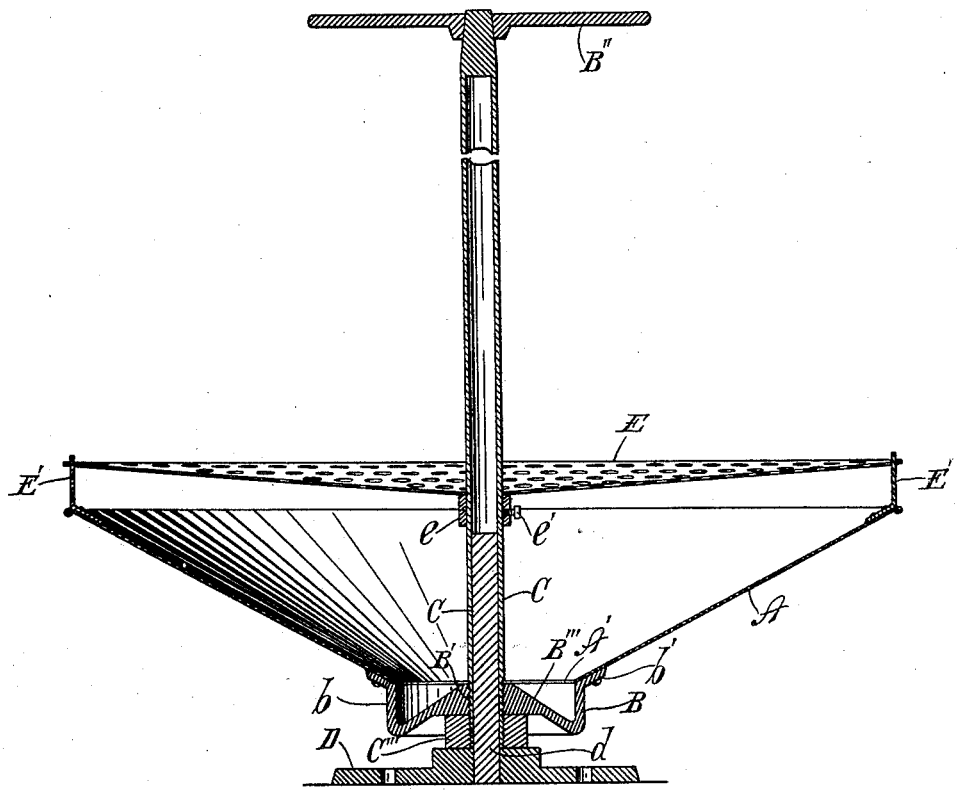

United States Patent Office.

THOMAS J. BURKE, OF LOS ANGELES, CALIFORNIA, ASSIGNOR TO WILLIAM A. RUSSELL AND WILLIAM E. KINSEY, OF SAME PLACE.

GOLD-SAVING APPLIANCE.

SPECIFICATION forming part of Letters Patent No. 672,413, dated April 16, 1901.

Application filed February 2, 1898. Renewed March 22, 1901. Serial No. 52,434. (No model.)

*To all whom it may concern:*

Be it known that I, THOMAS J. BURKE, a citizen of the United States, residing at Los Angeles, in the county of Los Angeles and State of California, have invented new and useful Improvements in Gold-Saving Appliances, of which the following is a specification.

The particular object of my invention is to produce a light compact gold-saving machine which will be suitable for convenient transportation to the almost inaccessible Klondike placers and one which will require no flumes, riffles, sluices, nor water under pressure to operate.

A further object of my invention is to produce a machine of this kind which will be very simple and not liable to get out of order, will be of the utmost lightness, will handle a large amount of dirt with a small expenditure of power and water, and will absolutely save all the gold in the material treated, no matter how much moss, muck, and trash is mixed therewith.

A further object of my invention is to provide a machine which will be suitable for use in a tank which may be kept full of hot water and in which the ground which is thawed and dug out from the Klondike placers during the winter may be quickly and thoroughly relieved of its gold after it is removed from the shaft in its thawed condition and before it has time to again freeze, thereby at slight cost enabling the miner to clean up his gold as his winter work progresses.

My invention depends for its operation upon the principle of separating matter by centrifugal force into its various classes according to its specific gravity.

My invention comprises the combination of a basin or receptacle having downwardly and inwardly sloping walls and means for journaling the basin to rotate in a horizontal plane.

My invention also comprises the various features of construction and combinations of parts whereby I am enabled to produce a machine of the utmost lightness and compactness, so that a device capable of handling many tons of auriferous material each day will weigh less than eight pounds and may be easily separated or taken to pieces and carried in an ordinary grip-sack or in the hand, if desired.

A further object of my invention is to provide a device which will handle auriferous material containing moss, roots, sticks, leaves, mud, and other substances which are difficult to handle in concentrating by the ordinary means and in which there will be no possibility whatever of any of the gold accidentally escaping from the device.

The accompanying drawings illustrate my invention.

Figure 2:
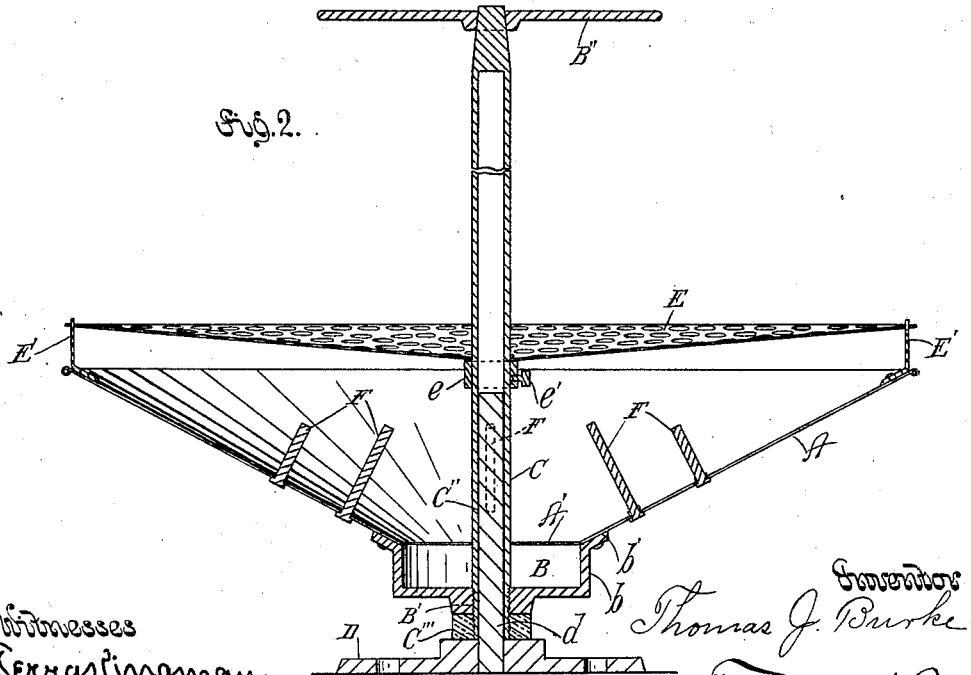

Figure 1 is a sectional perspective view of a device embodying my invention set up to work the auriferous matter as it is in its thawed condition dug from the Klondike placers. Fig. 2 is a longitudinal sectional view showing my invention arranged for ordinary use. Fig. 3 is a longitudinal sectional view of my device, showing the flanged cup provided with an upwardly-projecting conical bottom.

In the drawings, A represents the pan or receptacle, which is formed of sheet metal and slopes inwardly and downwardly in funnel shape. An opening A' is left at the center of the pan, and the inner edges of the pan are secured to a cast-metal cup B, which is provided with substantial vertical side walls $b$ and with an annular flaring lip $b'$, having the same inclination as the side walls of the pan. This cast or pressed metal cup is provided in its bottom with a screw-threaded socket B', and in the socket is screwed the lower end of a supporting-standard C, which is adapted at its top to receive a wrench or handle B'', whereby the pan may be partially or fully rotated. The lower end of the standard is provided with a journal-pin opening C'', and a suitable base D, which is adapted to be secured by bolts or screws to a suitable support, such as D', is provided with an upwardly-projecting journal-pin $d$, adapted to seat in the socket C'' and to hold the standard in a vertical position, thereby journaling the pan or receptacle to rotate in a horizontal plane.

As shown in the drawings, when the screw-threaded end of the standard C is fully screwed home into the socket B' the end projects below the bottom of the cup and a locknut C''' is screwed upon said projecting end to prevent the standard from accidentally unscrewing from the socket.

E is a grizzly or screen which is of substantially the same diameter as the pan or receptacle and is supported about an inch above the top of the pan by means of a collar $e$, which is secured upon the standard by means of a set-screw $e'$, and four supporting lugs or pins E', projecting above the rim of the pan, to engage and support the edge of the grizzly. This grizzly is slightly dished to throw toward the center the matter placed thereupon. To clean the grizzly from trash, the wrench is removed from the top of the standard, the grizzly slipped up off of the standard, inverted to throw the matter off, and then replaced. In making a device of this kind out of thin or light material, so as to be easily portable, it is necessary that its parts be securely braced against displacement by the weight of the heavy material which it is designed to handle. In rotating a widely-flaring pan if it were only secured at its bottom apex it would wabble at the top unless some means were taken to prevent it, and especially when loaded with earth and gravel. To prevent this uneven motion, which would soon rack the device out of shape or break it down, the upper edge of the pan is rigidly secured to the grizzly by means of the pins E', and the grizzly is rigidly secured against lateral motion by the standard C, which projects up through the central opening thereof, and the standard in turn is steadied by the hand of the operator on the handle B''. By having the pins project up through the edge of the grizzly the grizzly can be easily lifted off the pins, yet it is impossible for the pins to be accidentally disengaged from the grizzly, and especially when it is loaded down with material. The journal-pin $d'$ may be extended up within the standard C nearly to the top of the pan, which will also assist in steadying the pan, and by supporting the pan at the bottom of the standard can be made hollow clear to the top, thereby making it lighter without detracting from its usefulness.

F represents stirring or disintegrating pins secured to the pan and projecting thereinto to engage with the material being treated and to assist in its thorough disintegration before it passes from the pan.

In practical operation the device may be entirely submerged in water in a tank, as shown, or in a lake or river, the top of the pan being placed from one to ten inches below the top of the water, or the device may be placed upon a suitable support and a stream of water of one-half an inch or more fed into the pan above the grizzly near the standard and allowed to flow over the rim of the pan during treatment of the material.

In practical use the operator grasps the wrench with one hand and partially rotates the pan first in one direction and then in the other, while with the other hand the matter to be treated is shoveled upon the grizzly or screen as near the center thereof as practicable and the boulders and coarse gravel are by the rotary motion imparted to the pan and grizzly screened therefrom and discharged from the rim of the grizzly. The material which passes through the grizzly drops into the pan near the center thereof, and as the operator with movements of slight amplitude partially rotates the pan back and forth from right to left the material by reason of friction with the pan gains a slight rotary movement, and this rotary movement carries the lighter material toward the rim of the pan, while the heavier material, such as gold and other precious metal, settles toward the bottom and center of the device, passing into the cup or pocket, from which it is unable to escape by reason of said cup having vertical walls. The operator continues feeding material upon the grizzly as long as desired, the gold passing down into the cup and the lighter material spreading and passing outward over the edge of the pan, leaving all precious metals in the cup at the center.

When it is desired to clean the device from all waste material, a sudden quick rotation of the pan is given back and forth and all the material which is not contained within the cup or pocket is thrown from the receptacle, after which in case it is desired to clean up the device the same is lifted from its journal-pin and the contents of the cup dumped into a suitable receptacle.

When my device is used in treating auriferous material from the Klondike placers, a tank G is provided, having a furnace therebeneath, and after the material has been thawed and dug from the pay-streak the tank may be filled with water, which is then heated to a suitable degree, the embers and fag ends of the fuel used for thawing the ground being utilized for this purpose. Then the thawed material, which still retains considerable heat, is removed from the drift and treated in the tank, the amount of heat required to keep the water at a suitable degree being very slight, since the thawed gravel and pay matter itself must contain enough heat to avoid reducing the temperature of the water to any great degree. The utilization of the heat is further increased by providing the tank G with a rim or circular wall H near the center, which is located directly over the heat from below. The rim surrounds the pan and is preferably of a slightly less diameter than the diameter thereof and extends nearly up to the rim of the pan, so that the heat from the fire is retained directly around the pan, while the entire tank can be filled with water to facilitate the separation of the gold from the waste after the material has been sufficiently thawed by the heat.

My machine, with its complete combination, will weigh less than eight pounds, and by removing the standard from the screw-threaded socket in the cup is rendered capable of being contained in a small space, forming a bundle which can be conveniently carried.

It is possible for heavy gravel to lodge in the form of cup shown in Figs. 1 and 2 if such gravel falls so close to the stem or standard as to avoid gaining sufficient rotary movement to carry it outward from the stem before it has time to work its way down sufficiently far to catch against the side walls of the cup.

In Fig. 3 I have shown a cup having an upwardly-projecting conical bottom $B'''$, which prevents the gravel from working down into the cup until it has passed far enough from the center of the cup to give it sufficient movement to carry it outward without permitting it to work its way down into the cup. The slope of the upwardly-extending conical bottom $B'''$ also prevents the wedging of rocks between the walls $b$ of the cup and the standard C. Without the use of the upwardly-extending conical bottom rocks, &c., are liable to wedge between the wall $b$ of the cup and the stand and C, in which case the washing of the ore is interfered with on account of the material and water inside the cup and pan coming in contact and being resisted by the obstruction. The sloping bottom formed by the upwardly-extending cone does not afford any footing for the rock to become wedged against, but will allow the rock to roll freely around when the pan is rotated, and when the rotation is of sufficient speed the rock will be thrown outwardly from the center tangentially toward the periphery of the pan.

Now, having described my invention, what I claim as new, and desire to secure by Letters Patent, is—

1. In a portable gold-saving apparatus, the combination with a base provided with a vertical journal-pin; of a funnel-shaped pan provided with a hollow standard and journaled upon the pin; said standard projecting above the top of the pin and being provided with a removable handle; pins rigidly secured to the edge of the pan and projecting above the top thereof; a perforated screen removably mounted on the standard and having its periphery rigidly and removably secured to the pin on the pan; and a removable collar upon the standard below the central portion of the screen.

2. In a portable gold-saving apparatus, the combination with a base provided with a vertical journal-pin; of a flanged cup provided with a perforated upwardly-projecting conical bottom; a hollow standard projecting through the bottom of the cup and journaled upon the pin of the base; a jam-nut on the standard below the bottom of the cup; a removable handle on top of the standard; and a flaring pan secured to the flange of the cup.

3. In a portable gold-saving apparatus, the combination, with a base provided with a vertical journal-pin; of a flanged cup provided with a perforated, upwardly-projecting, conical bottom; a hollow standard projecting through the bottom of the cup and journaled upon the pin of the base; a jam-nut on the standard below the bottom of the cup; a removable handle on top of the standard; a flaring pan secured to the flange of the cup; and means for rigidly connecting the top of the pan to the standard.

4. In a gold-saving apparatus, the combination, with a tank; of a base removably secured to the bottom thereof; a journal-pin in the base; a flaring pan journaled on the pin and provided with means for operating it; and a circular wall on the bottom of the tank around the pan, the top of which is below the top of the pan, said tank being adapted to be supported over a fire and heated.

THOMAS J. BURKE.

Witnesses:
ALFRED I. TOWNSEND,
F. M. TOWNSEND.